UNITED STATES PATENT OFFICE.

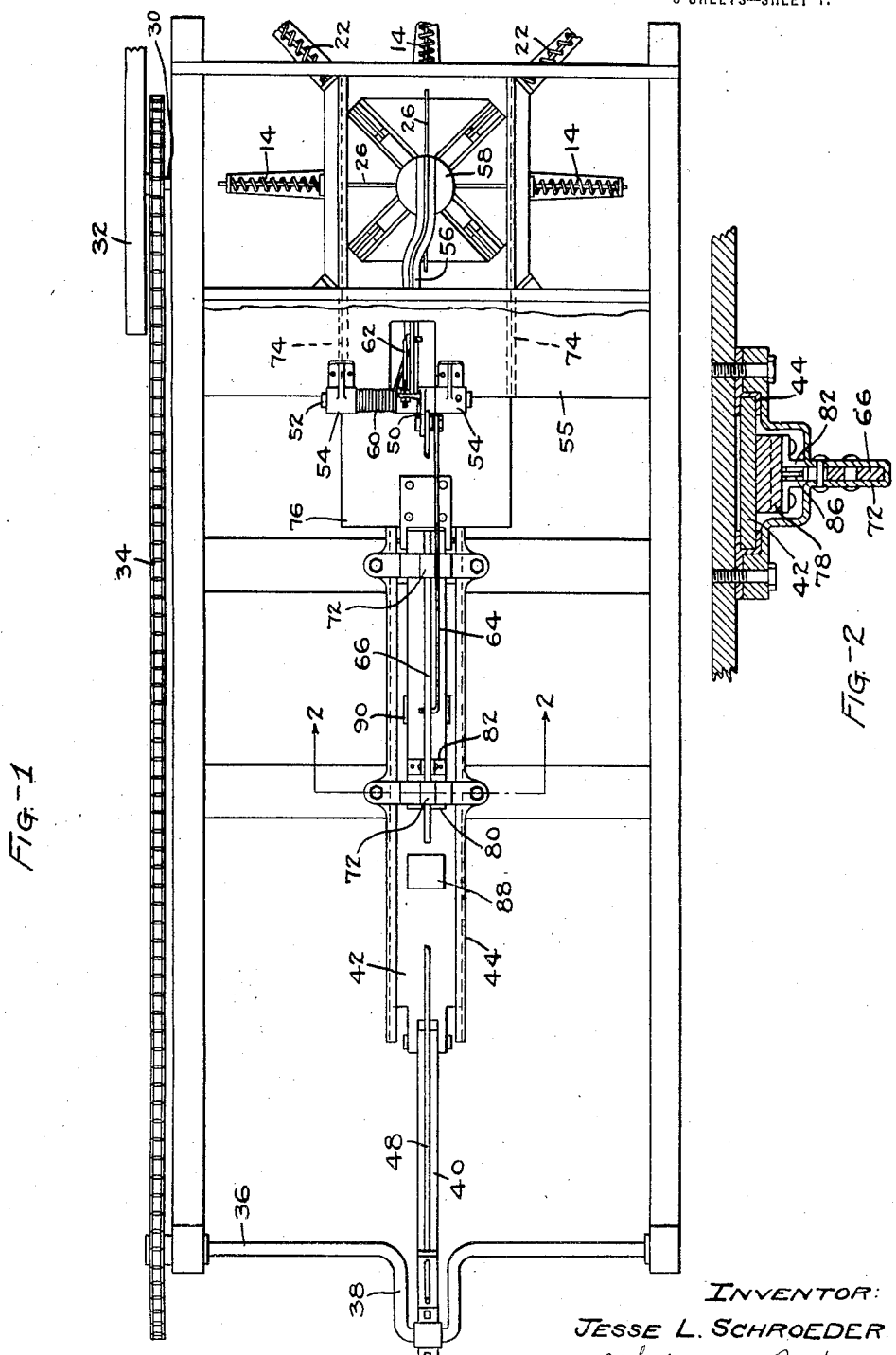

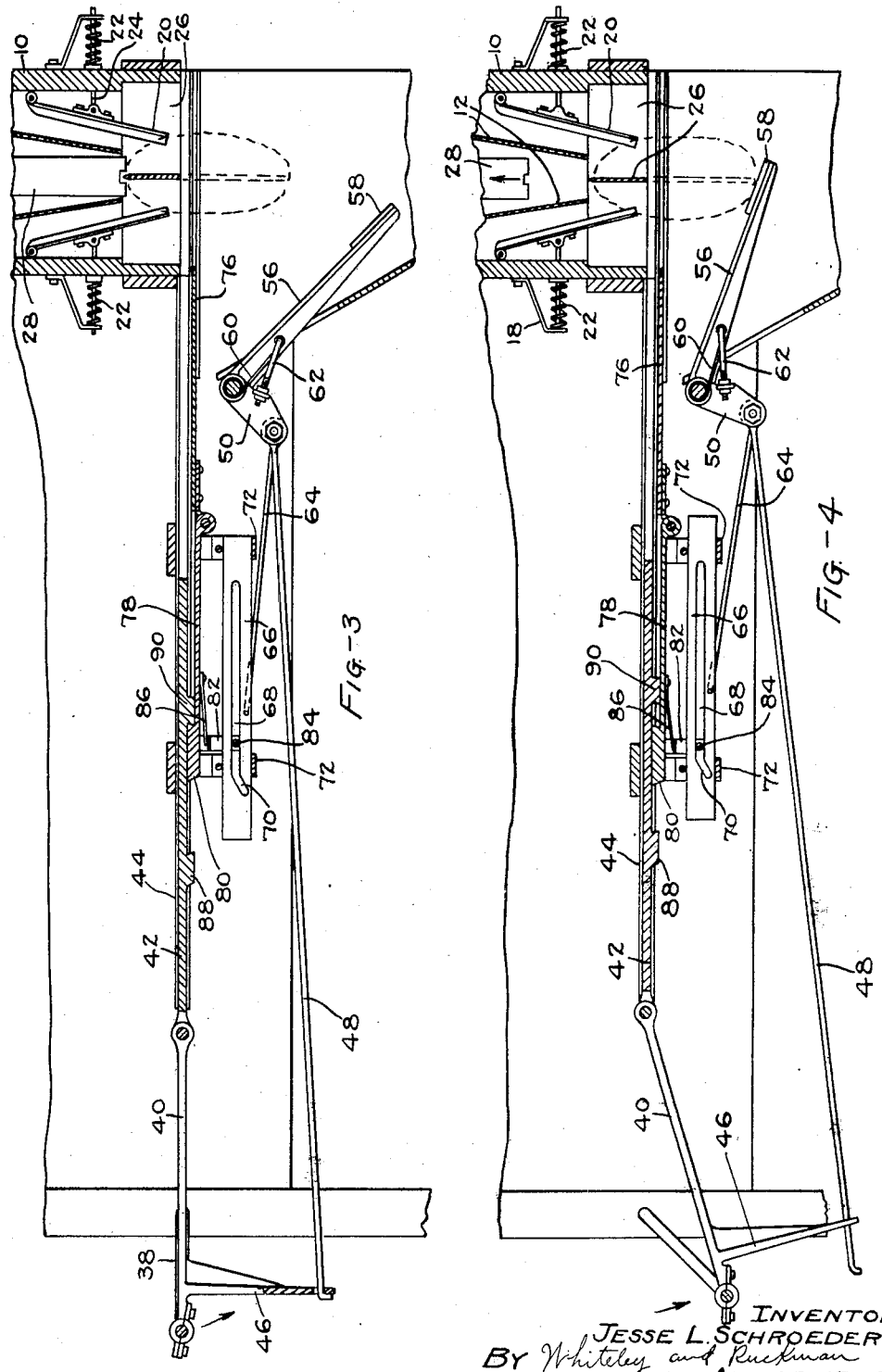

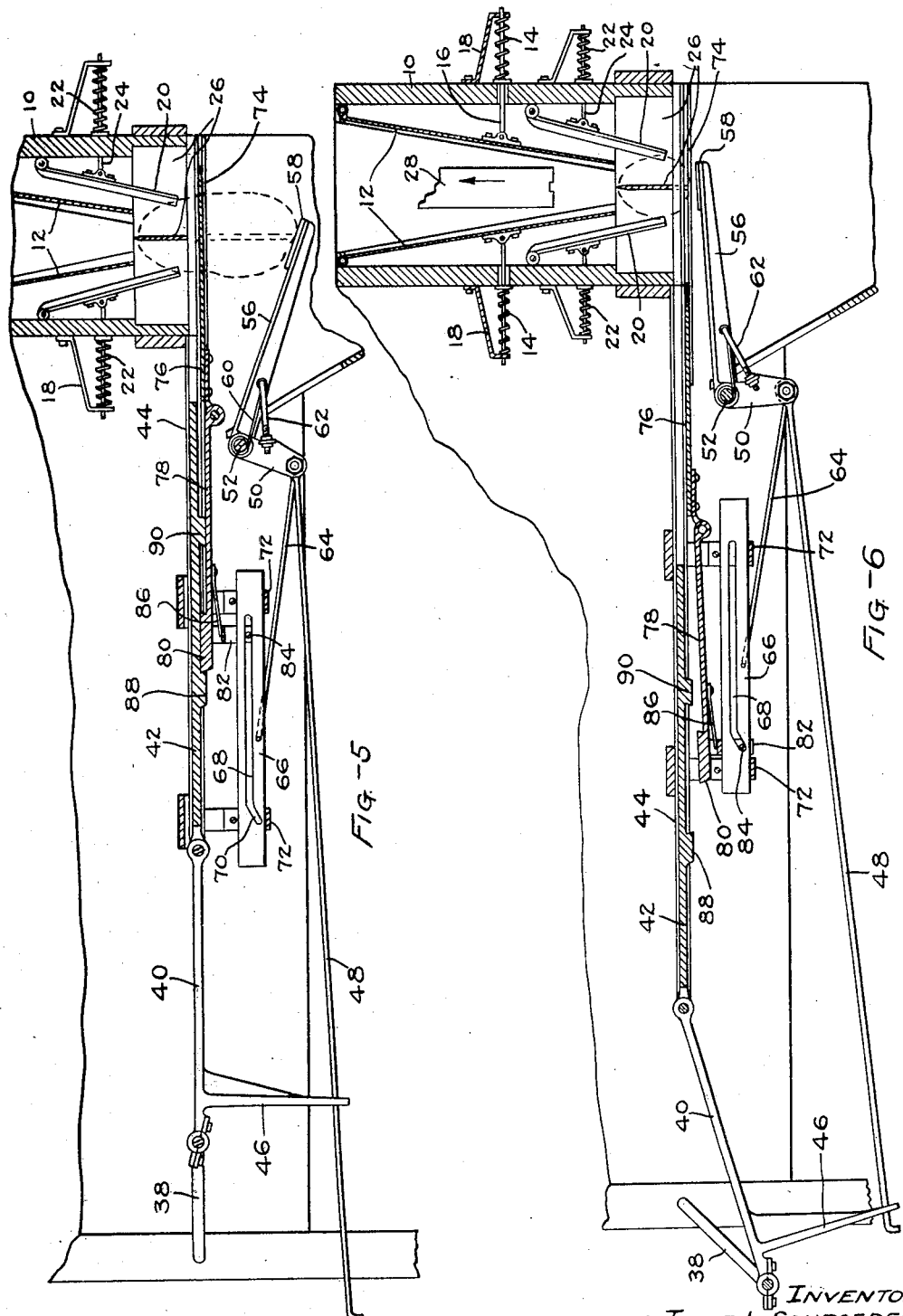

JESSE LYLE SCHROEDER, OF ERIE, NORTH DAKOTA.

MACHINE FOR CUTTING SEED-POTATOES.

1,347,058.   Specification of Letters Patent.   Patented July 20, 1920.

Application filed March 5, 1920. Serial No. 363,436.

*To all whom it may concern:*

Be it known that I, JESSE LYLE SCHROEDER, a citizen of the United States, residing at Erie, in the county of Cass and State of North Dakota, have invented certain new and useful Improvements in Machines for Cutting Seed-Potatoes, of which the following is a specification.

My invention relates to machines for cutting seed potatoes and an object is to provide an efficient mechanism whereby long potatoes will be cut into more pieces than potatoes of moderate size. This invention involves an improvement on the invention disclosed and claimed in my prior application, Serial Number 283,156, filed March 17, 1919, which has eventuated into Patent Number 1,337,968, dated Apr. 20, 1920.

The full objects and advantages of my invention will appear in connection with the detailed description thereof, and the novel features embodied in my inventive idea will be particularly pointed out in the claims.

In the accompanying drawings,—

Figure 1 is a bottom plan view. Fig. 2 is a view in section on the line 2—2 of Fig. 1. Fig. 3 is a sectional view showing the position of parts after a potato has been cut longitudinally and prior to cutting transversely. Fig. 4 is a sectional view showing the position of parts set to cut a long potato transversely. Fig. 5 is a sectional view showing the position of parts just as a long potato has been cut transversely. Fig. 6 is a sectional view showing the position of parts shortly after a moderate sized potato has been cut longitudinally.

Referring to the particular construction shown in the drawings, the character 10 designates a cutting-box which is square in cross-section and which is provided on its interior with an upper set of holding fingers 12 pivoted to the top of the box as shown in Fig. 6, the lower ends of the fingers being free and normally urged inwardly by coiled springs 14 which surround rods 16 attached to the fingers and passing outside the box for extending slidably through brackets 18. The springs are held between the brackets and shoulders on the rods. A lower set of fingers 20 are pivoted at their upper ends to the interior of the box intermediate the length thereof, and these fingers have their lower free ends normally urged inwardly by coiled springs 22 surrounding rods 24 arranged in the same manner as the rods 16. The fingers 12 and 20 are preferably positioned around the box at forty-five degrees from each other. The fingers 12 serve to center the potatoes endwise above a pair of cross stationary cutting blades 26 secured within the cutting-box. Operating above the cutting blades is a plunger 28 which is reciprocated in any suitable manner, as from a shaft 30 having a pulley 32 secured thereto for driving the machine by power. A sprocket chain 34 passes over a sprocket wheel secured to this shaft and over a sprocket wheel secured to a shaft 36 which is provided with a crank 38. The plunger 28 on its downward movement engages a potato which is held in longitudinal position by the upper fingers 12 and forces it lengthwise upon the blades 26 so that it is cut into quarters. If the potato exceeds a certain length it is also cut transversely to form eight pieces by mechanism operating in connection with the crank 38 in the following manner: Journaled on the crank is a pitman 40 which at its other end is attached to a slide 42 mounted to reciprocate in the slideways 44. Extending at right angles from the pitman 40 is an arm 46 through a hole in the outer end of which a rod 48 extends slidably, the end of the rod being bent to prevent disengagement. The other end of the rod 48 is attached to an arm 50 which is rotatably mounted on a rod 52 secured in brackets 54 attached to a transverse member 55, as shown in Fig. 1. Adjustably connected with the arm 50 for partial rotation therewith is an arm 56 the free end of which is provided with an enlarged portion or pan 58. A coil spring 60 surrounds a portion of the rod 52, one end of this spring being fixed and the other end being secured to the arm 56 to rotate the latter upwardly. A short rod 62 is attached at one end to the arm 56 and the other end of this rod extends through an offset portion on the arm 50, this latter end of the rod 62 being screw-threaded and provided with nuts whereby the position of the arm 56 and pan 58 may be adjusted. By referring to Fig. 3 it will be seen that when the plunger 28 is in its lowest position the crank 38 at this time has caused the arm 46 to pull the rod 48 and depress the pan 58 in opposition to the tension of the spring 60. It will be understood that potatoes after being cut longitudinally are held by the lower fingers 20, and it will be evident from Fig. 6 that the next potato as it is being cut will force out the potato which is held by the fingers 20. In order to provide for unobstructed delivery of the potatoes when released, the mechanism just described for pulling down the pan 58 when the plunger comes into its lowest position is provided. In case a moderate size potato has just been cut, as shown in Fig. 6, the pan 58 returns to its full upward position as the crank 38 rotates and the plunger 28 rises. But if a long potato has just been cut longitudinally it is evident that the pan 58 is prevented from returning completely to its upward position, as shown in Fig. 4. When the pan is thus in its intermediate position the potato will be cut transversely by the following mechanism. The arm 50 is connected by a rod 64 with a slidable bar 66 having a longitudinal slot 68 therein terminating in an inclined portion 70 at its outer end. The bar 66 is mounted for a limited sliding movement in slideways 72. Slidably mounted in slideways 74 is a knife-blade 76 to the rear end of which is pivotally attached a strip 78 having on its upper side a dove-tailed projection 80. Depending from the strip 78 are a pair of lugs 82 which straddle the bar 66. A double-headed pin 84 is mounted in elongated openings in the lugs 82 and this pin is adapted to slide in the slot 68 and the inclined end portion 70. A spring 86 tends to hold the strip 78 upwardly at its rear end, but the strip is pulled down by the action of the pin 84 when the latter is in the incline 70. The slide 42 carries on its underside, projections 88 and 90 which are adapted to engage the dovetailed projection 80 when the rear end of the member 78 is in its raised position.

The operation and advantages of my invention will be readily understood from the foregoing description. Potatoes which are to be cut for use as seed potatoes for planting are delivered one at a time in any suitable manner into the upper end of the box 10, and the fingers 12 cause them to assume a vertical position. The plunger 28 then descends and forces the potato upon the cutting blades 26, which sever it into four pieces. The fingers 20 retain these pieces, the movement of the latter through the cutter forcing out the potato which was transversely cut. As is apparent from Fig. 3, the pan 58 is caused to descend each time when the plunger is moving into its lowest position. When the plunger moves upwardly the arm 46 ceases to pull the pan downwardly and the spring 60 moves the pan into its extreme upward position in case a moderate sized potato has been cut, as shown in Fig. 6. In this position of the parts the pin 84 is in the incline 70, since the rod 64 pulls the bar 66 forwardly. However, in the case of a long potato the pan comes against the lower end thereof and is retained in the position shown in Fig. 4, with the result that the pin 84 is maintained in the longitudinal slot 66 and the strip 78 with the dovetailed projection 80 is held up. In this position the projection 88 on the slide 42 comes into engagement with the projection 80 and the knife-blade 76 is caused to move and cut the potato transversely through substantially the middle thereof, as shown in Fig. 5. When the slide 42 moves rearwardly the projection 90 engages the other side of the projection 80 and retracts the cutter-blade, the pin 84 moving in the slot 66 toward the rear end thereof. The lower pieces of the cut potato drop off the pan and the latter then moves into its uppermost position, as shown in Fig. 6, the rod 64 pulling the bar 66 forwardly so that the pin 84 runs down incline 70 and depresses the rear end of the strip 78. The device is then in a position for another cutting operation and the knife-blade 76 will then remain at rest or be operated according to whether the next potato is a long one or of only moderate size.

I claim:

1. In a machine for cutting seed potatoes, the combination of a cutting-box, stationary knives in said cutting-box, means for forcing potatoes upon said knives to cut them longitudinally, means for holding the pieces of the potato which has just been cut, a pivoted member having its free end underneath and normally urged toward said cutting-box, means for depressing said pivoted member when said forcing means forces a potato upon said knives, a horizontally-movable knife blade, and means for causing said knife blade to move and cut transversely a long potato when said pivoted member is restrained thereby from returning to its full upward position.

2. In a machine for cutting seed potatoes, the combination of a cutting-box, stationary knives in said cutting-box, means for forcing potatoes upon said knives to cut them longitudinally, means for holding the pieces of the potato which has just been cut, a pivoted member having its free end underneath and normally urged toward said cutting-box, means for depressing said pivoted member when said forcing means forces a potato upon said knives, a slidable bar having a longitudinal slot terminating in a downwardly-inclined portion, connections between said pivoted member and said slotted bar for moving the latter forwardly when said pivoted member is in its upward position, a horizontally-movable knife blade adapted to reciprocate beneath said cutting-box, a pin connected to said knife blade for movement in said slot, a reciprocating slide, and means for coupling said slide and said movable knife when said pin is in the horizontal portion of said slot.

3. In a machine for cutting seed potatoes, the combination of a cutting-box, stationary knives in said cutting-box, a reciprocating plunger for forcing potatoes upon said knives to cut them longitudinally, means for holding the pieces of a potato which has just been cut, a pivotally-mounted arm having its free end underneath and normally urged toward said cutting-box, a crank, a pitman connected to said crank, connections between said pitman and arm for depressing the latter during a portion of the rotation of said crank, a slidable bar having a longitudinal slot terminating in a downwardly-inclined portion, connections between said arm and said slotted bar for moving the latter forwardly when said arm is in its upward position, a horizontally-movable knife-blade adapted to reciprocate beneath said cutting-box, a strip pivotally attached to the rear end of said knife blade, a pin supported by said strip and movable in said slot, a slide attached to the end of said pitman, and means for coupling said slide and said strip when said pin is in the horizontal portion of said slot.

4. In a machine for cutting seed potatoes, the combination of a cutting-box, stationary knives in said cutting box, a reciprocating plunger for forcing potatoes upon said knives to cut them longitudinally, means for holding the pieces of potato which has just been cut, a pivotally-mounted arm having its free end underneath and normally urged toward said cutting-box, a crank, a pitman connected to said crank, a projection on said pitman, connections between said projection and said arm for depressing the latter during a portion of the rotation of said crank, a slidable bar having a longitudinal slot terminating in a downwardly-inclined portion, connections between said arm and said slotted bar for moving the latter forwardly when said arm is in its upward position, a horizontally-movable knife blade adapted to reciprocate underneath said cutting-box, a strip pivotally attached to the rear end of said knife blade, a pair of lugs depending from said strip and straddling said slidable bar, a pin carried by said lugs and movable in said slot, a slide attached to the end of said pitman, projections on the underside of said slide, and a projection on the upper side of said strip adapted to engage said first-mentioned projections when said pin is in the horizontal portion of said slot.

5. In a machine for cutting seed potatoes, the combination of a cutting-box, stationary knives in said cutting-box, a reciprocating plunger for forcing potatoes upon said knives to cut them longitudinally, means for holding the pieces of the potato which has just been cut, a pivotally-mounted arm having its free end underneath and normally urged toward said cutting-box, an arm adjustably connected with said first-mentioned arm, a rod attached to the free end of said second-mentioned arm, a crank, a pitman connected to said crank, a projection on said pitman, said rod being slidably connected with said projection, a slidable bar having a longitudinal slot terminating in a downwardly-inclined portion, a rod connecting the free end of said second-mentioned arm with said slotted bar for sliding the latter, a horizontally-movable knife blade adapted to reciprocate underneath said cutting-box, a strip pivotally attached to the rear end of said knife blade, a pair of lugs depending from said strip and straddling said slidable bar, a pin carried by said lugs and movable in said slot, a slide attached to the end of said pitman, projections on the underside of said slide, and a projection on the upper side of said strip adapted to engage said first-mentioned projections when said pin is in the horizontal portion of said slot.

In testimony whereof I hereunto affix my signature.

JESSE LYLE SCHROEDER.